US011662954B1

(12) United States Patent
Itagaki et al.

(10) Patent No.: US 11,662,954 B1
(45) Date of Patent: May 30, 2023

(54) DUPLICATING TAPE MEDIA WITHIN A TAPE STORAGE SYSTEM BASED ON COPY TAPE DATABASE

(71) Applicant: International Business Machines Corporation, Armonk, NY (US)

(72) Inventors: Hiroshi Itagaki, Yokohama (JP); Shinsuke Mitsuma, Machida (JP); Tsuyoshi Miyamura, Yokohama (JP); Noriko Yamamoto, Tokyo (JP); Tohru Hasegawa, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/698,235

(22) Filed: Mar. 18, 2022

(51) Int. Cl.
*G06F 3/06* (2006.01)

(52) U.S. Cl.
CPC .......... *G06F 3/0686* (2013.01); *G06F 3/0605* (2013.01); *G06F 3/065* (2013.01)

(58) Field of Classification Search
CPC ......... G06F 3/0604; G06F 3/0647–065; G06F 3/0686; G06F 3/0631
See application file for complete search history.

(56) References Cited

U.S. PATENT DOCUMENTS

| | | | | |
|---|---|---|---|---|
| 5,758,067 A * | 5/1998 | Makinen | ............ | G06F 11/1461 714/E11.124 |
| 8,213,104 B2 | 7/2012 | Fujihara | | |
| 8,458,422 B1 * | 6/2013 | Holdman | ............ | G06F 11/1479 711/E12.001 |
| 8,600,937 B1 * | 12/2013 | Ravan | ................. | G06F 11/1456 707/645 |
| 10,120,612 B2 | 11/2018 | Hasegawa | | |
| 10,191,663 B1 * | 1/2019 | O'Neill | ................ | G06F 3/0604 |
| 2005/0071710 A1 * | 3/2005 | Micka | ................. | G06F 11/2074 714/E11.107 |
| 2006/0271754 A1 * | 11/2006 | Shibayama | ............. | G06F 3/067 711/165 |
| 2009/0276565 A1 * | 11/2009 | Fujibayashi | ............ | G06F 3/067 711/E12.019 |
| 2013/0271865 A1 * | 10/2013 | Amir | ................... | G11B 5/00826 |
| 2017/0091252 A1 * | 3/2017 | Debiec | ................ | G06F 16/2272 |

(Continued)

OTHER PUBLICATIONS

"Copying hydrated data to tape storage for disaster recovery", IBM, Spectrum Protect, 8.1.11, downloaded from the Internet on Oct. 29, 2021, 4 pages, <https://www.ibm.com/docs/en/spectrum-protect/8.1.11?topic=pool-copying-hydrated-data-tape-disaster-recovery>.

*Primary Examiner* — Chie Yew
(74) *Attorney, Agent, or Firm* — Stephen R. Yoder

(57) ABSTRACT

Computer software and/or hardware configured to select a first tape medium of a first pool and a second tape medium of a second pool based, at least in part, on a migration command for a file, instruct a tape drive to write the file to both the first tape medium of the first pool and a third tape medium of a system pool of a tape library, record a file identifier (ID) for the file and an identifier for the second tape medium of the second pool in a copy tape database (CTDB), wherein the file ID points to the file written to the third tape medium of the system pool, and instruct the tape drive to read the file from the third tape medium of the system pool utilizing the file ID in the CTDB and to write the file to the second tape medium of the second pool.

20 Claims, 4 Drawing Sheets

(56) References Cited

U.S. PATENT DOCUMENTS

| | | |
|---|---|---|
| 2018/0081553 A1 | 3/2018 | Freitag |
| 2018/0267713 A1* | 9/2018 | Saito .................... G06F 3/0644 |
| 2019/0196749 A1 | 6/2019 | Taguchi |

* cited by examiner

DUPLICATING TAPE MEDIA WITHIN A TAPE STORAGE SYSTEM BASED ON COPY TAPE DATABASE

BACKGROUND OF THE INVENTION

The present invention relates generally to tape library hierarchical storage management, and more particularly to duplicating tape media within a tape library.

The growing volume of data, and the storage capacity to service information technology, has increased over the years. Other significant trends that affect planning storage strategies include data migration to storage.

Tape cartridges have traditionally been used for video archives, back-up files, replicas for disaster recovery, and retention of information on premise. Tape media (e.g., tape cartridges) are commonly stored in enterprise tape libraries. In order to preserve these tape media, high-density tape library frames containing high-density (HD) tape media storage slots are utilized, where a single HD tape media storage slot, for example, can hold up to five tape cartridges stacked in a row, instead of a single tape cartridge to a storage slot. Each tape cartridge in the HD tape media storage slot is referenced with a tier number indicating a position within the HD tape media storage slot, where the tier number increases in a depth direction as more tape media is added to the HD tape media storage slot.

Tape library frames having hierarchical storage management (HSM) include a plurality of tape drives, a primary storage device composed of a hard drive disk (HDD) for storing data, and a plurality of tape media for further storing the data during migration operations. A pre-migration state exists when the data is stored on both the primary storage device and the plurality of tape media. After a certain period of time, the data in the primary storage device is deleted and the data is only stored on the plurality of tape media (i.e., a migration state).

SUMMARY

Aspects of an embodiment of the present invention disclose an apparatus, a method, a computer program product, and a computer system for duplicating tape media within a tape library. The method includes selecting, by the one or more computer processors, a first tape medium of a first pool and a second tape medium of a second pool based, at least in part, on a migration command for a file. The method includes instructing, by the one or more computer processors, a tape drive to write the file to both the first tape medium of the first pool and a third tape medium of a system pool of a tape library. The method includes recording, by the one or more computer processors, a file identifier (ID) for the file and an identifier for the second tape medium of the second pool in a copy tape database (CTDB), wherein the file ID points to the file written to the third tape medium of the system pool. The method includes instructing, by the one or more computer processors, the tape drive to read the file from the third tape medium of the system pool utilizing the file ID in the CTDB and to write the file to the second tape medium of the second pool.

DETAILED DESCRIPTION

Embodiments of the present invention recognize that when a set of files stored on a tape medium of a copy source is identical to the set of files stored on tape media of a copy destination, managing tape media, especially those are stored externally, is simplified. For example, a copy source pool is a tape media pool including tape media that have been identified as a source of a file or files targeted for migration. A full-contents copy pool is a pool of tape media created as a corresponding recording destination for the file or files of the copy source pool, where the full-contents copy pool functions as a complete copy/backup of the copy source pool, and includes the same set of files that are stored in the copy source tape media while storing files in parallel by using multiple tape media and tape drives of a tape library.

Embodiments of the present invention recognize that copies of files in tape media should be exported from a system when the tape media is exported. Embodiments of the present invention recognize that when the copy of files in the tape media are distributed to additional tape media, each of the additional tape media also have a copy of the files from different source tape media. Embodiments of the present invention recognize that under this condition, it is practically impossible to export files stored on a tape medium and a copy of those files only.

Embodiments of the present invention recognize an advantage in creating a "full-contents copy" of a tape medium, that is, a tape medium that has a complete copy of a set of files stored in a copy source tape medium, while also maintaining the advantage of storing files in parallel utilizing multiple tape media and tape drives within a tape library. Implementation of such embodiments may take a variety of forms, and exemplary implementation details are discussed subsequently with reference to the Figures.

Figure 1:
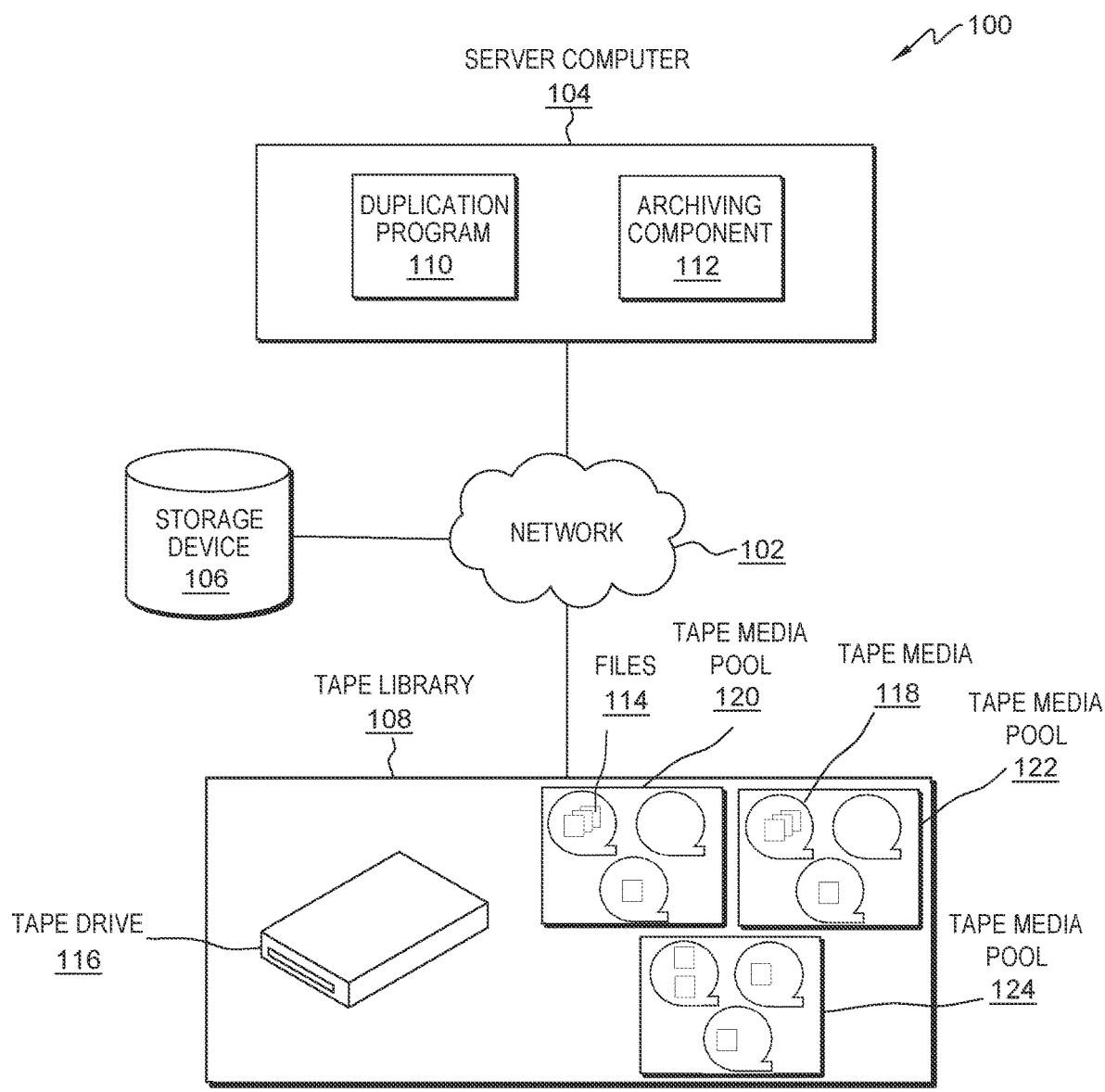
FIG. 1 illustrates a tape library hierarchical storage management environment, in accordance with an embodiment of the present invention.

Referring now to various embodiments of the invention in more detail, FIG. 1 is a functional block diagram that illustrates a portion of a tape library hierarchical storage management environment, generally designated 100, suitable for providing tape library hierarchical storage management, in accordance with at least one embodiment of the invention. In one embodiment, tape library hierarchical storage management environment 100 includes a network, such as network 102, a host, such as server computer 104, a primary storage device, such as storage device 106, and a tape library, such as tape library 108. In one embodiment, a plurality of tape library frames (not shown), can be interconnected to form one or more tape libraries, such as tape library 108. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. In one embodiment, server computer 104, storage device 106, and tape library 108 are interconnected by network 102. In one embodiment, network 102 can be any combination of connections and protocols capable of supporting data migration and data recall within a tape library hierarchical storage management environment, such as tape library hierarchical storage management environment 100, between a host, such as server computer 104, a primary storage device, such as storage device 106, a secondary storage location, such as tape library 108, utilizing a tape media duplication program, such as duplication program 110. In one embodiment, network 102 connects a host, such as server computer 104, to a primary storage device, such as storage device 106, a secondary storage location, such as tape library 108, and a tape drive, such as tape drive 116, utilizing any fiber channel protocol, such as small computer system interface (SCSI), internet protocol-based iSCSI over transmission control protocol/internet protocol (TCP/IP) and serial attached SCSI (SAS), capable of supporting SCSI commands.

In another embodiment, network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments that may be implemented by those skilled in the art.

In one embodiment, a host, such as server computer 104, may be, for example, a server computer system, such as a database management server, a tape library management server, database server, a web server, a structured query language server or any other electronic device or computing system capable of sending and receiving data. In one embodiment, server computer 104 may be a mainframe virtual tape solution that includes a duplicated tape media at a storage system which utilizes a tape library storage system, such as tape library 108. In one embodiment, server computer 104 may write data to physical tape storage utilizing high performance tape drives installed in a tape library, such as tape drive 116 of tape library 108, utilizing SCSI commands. In one embodiment, server computer 104 may provide a tiered storage hierarchy of disk and tape storage caches. In another embodiment, server computer 104 may be a data center comprising a collection of networks and servers providing an IT service, such as virtual servers and applications deployed on virtual servers, to an external party. In one embodiment, server computer 104 may be a database server operating on a legacy system, such as a mainframe system. In another embodiment, server computer 104 represents a "cloud" of computers interconnected by one or more networks, such as network 102, where server computer 104 is a computing system utilizing clustered computers and components to act as a single pool of seamless resources when accessed through network 102. This is a common implementation for data centers in addition to cloud computing applications. In the one embodiment, server computer 104 includes a tape media duplication program, such as duplication program 110 and an archiving component, such as archiving component 112.

In an alternative embodiment, the host may be a client computer (not shown) that is a client to a host, such as server computer 104, and may be, for example, a server, a desktop computer, a laptop computer, a tablet computer, a personal digital assistant (PDA), a smart phone, a thin client or any other electronic device or computing system capable of communicating with server computer 104 through network 102 within a tape library hierarchical storage management environment, such as tape library hierarchical storage management environment 100. For example, the client computer may be a laptop computer capable of connecting to a network, such as network 102, to submit one or more migration and/or data archiving commands to a primary storage device, such as storage device 106, and a tape drive of a tape library, such as tape drive 116 of tape library 108, utilizing a tape media duplication program, such as duplication program 110, via a host, such as server computer 104. In another embodiment, the client computer may be any suitable type of client device capable of submitting one or more migration and/or data archiving requests (e.g., write requests) to a host, such as server computer 104. In one embodiment, the client computer may include a user interface (not shown) for submitting data requests to a data tape management server, such as server computer 104. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels or text navigation. In computers, GUIs were introduced in reaction to the perceived steep learning curves of command-line interfaces, which required commands to be typed on the keyboard. The actions in GUIs are often performed through direct manipulation of the graphics elements.

In one embodiment, duplication program 110 operates on a central server, such as server computer 104, and may be utilized by one or more client computers (not shown) via network 102. In another embodiment, duplication program 110 may be a software-based program downloaded from the central server or a third-party provider (not shown) and executed on a client computer to duplicate tape media during migration operations by creating a full-contents copy tape media of a copy source tape media (i.e., a duplicate tape media of copy destination for a copy source tape media), such as tape media 118, which includes the same set of files, such as files 114, that are stored in the copy source tape media. In another embodiment, duplication program 110 may be a software-based program, downloaded from a central server (not shown) and installed on one or more client devices (e.g., a phone, a tablet, a wearable electronic device, etc.) (not shown). In yet another embodiment, duplication program 110 may be utilized as a software service provided by a third-party cloud service provider (not shown). In yet another embodiment, duplication program 110 may include one or more software-based components, such as add-ons, plug-ins, and agent programs, etc., installed on one or more client devices, to duplicate tape media during migration operations by creating a full-contents copy tape of a copy source tape media, such as tape media 118, which includes the same set of files, such as files 114, that are stored in the copy source tape media.

In one embodiment, duplication program 110 is a software-based program for tape media duplication during a migration operation. In one embodiment, duplication program 110 provides a mechanism for creating a full-contents copy tape media of a copy source tape media, where the full-contents copy tape media has the same set of files that are stored in the copy source tape media while storing files in parallel by using multiple tape media and tape drives of a tape library. In one embodiment, duplication program 110 provides a mechanism for a host, such as server computer 104, to send a migration command to a tape drive, such as tape drive 116, where the migration command is a defined SCSI command used to control the tape drive and transfer a large quantity of data to a storage device, including, but not limited to, hard disk drives, solid state drives, tape drives, etc. In one embodiment, duplication program 110 provides a mechanism for, when saving a file to a tape media in a first tape media pool and redundantly writing the file to a tape media in a second tape media pool, recording pointer information (e.g., writing a pointer to the file) in the second tape media pool and writing the file to a tape media of a third tape media pool. In one embodiment, duplication program 110 provides a mechanism to automatically add tape media to a second tape media pool, as needed, and copy files from tape media of a third tape media pool to tape media of the second tape media pool based, at least in part, on the pointer information recorded separately in the second tape media pool, thereby creating full-contents copy tape media in the second tape media pool for files recorded in tape media of a first tape media pool. In one embodiment, a duplication program, such as duplication program 110, is compatible and functions with each tape media and each tape drive within a tape library.

In one embodiment, archiving component 112 is an enterprise-scale linear tape file storage (LTFS) formatted component for scalable hierarchical data storage management. In one embodiment, archiving component 112 provides direct, intuitive and graphical access to data stored in tape media of a tape library, such as tape media 118 of tape library 108, and by incorporating an LTFS format standard for reading, writing, and exchanging descriptive metadata on formatted tape media. In one embodiment, archiving component 112 provides for the movement of files to and from tape media in a tape library, where a scale-out architecture provides the ability to add nodes and tape media to satisfy bandwidth and data requirements between a disk tier and a tape storage tier. In one embodiment, archiving component 112 enables tape media pooling and data exchange for tape tier management, where multiple copies of files can be written to different tape media pools, including different tape libraries in different locations. In one embodiment, archiving component 112 provides the capability to integrate LTFS with a scaled tier disk storage system, enabling a user to utilize applications designed for disk files on tape media. In one embodiment, archiving component 112 provides the capability to utilize LTFS for policy management of tape media as a storage tier in a scaled storage environment, thereby leveraging tape media as a critical tier in the scaled storage environment. In one embodiment, archiving component 112 provides the capability to replace online disk storage with tier 2 and tier 3 tape media storage. In one embodiment, archiving component 112 is component that can effectively use disk space by recording the main body data of a file on the disk to a tape medium, leaving only the metadata on the disk. In one embodiment, archiving component 112 may be fully integrated, partially integrated, or separate from duplication program 110. In one embodiment, archiving component 112 can communicate with duplication program 110, and is capable of receiving and processing instructions communicated by duplication program 110. In some embodiments, archiving component 112 may include a migration queue and a recall queue (not shown) that are first-in-first-out (FIFO) data structures that include a collection of data requests for a primary storage device, such as storage device 106, and a tape library, such as tape library 108, in a tape library hierarchical storage management environment, such as tape library hierarchical storage management environment 100. In one embodiment, the migration queue may be a linear data structure that provides the capability to accumulate one or more migration requests for data to be written from a primary storage device, such as storage device 106, to one or more magnetic tape cartridges of a tape library, such as tape media 118 of tape library 108. In one embodiment, the recall queue may be a linear data structure that provides the capability to accumulate one or more recall requests for data to be read from one or more magnetic tape cartridges of a tape library, such as tape media 118 of tape library 108, and sent to a primary storage device, such as storage device 106. In some embodiments, the migration queue is a shared queue, processed exclusively.

In one embodiment, storage device 106 is a primary storage device utilized in a tape library hierarchical storage management environment, such as tape library hierarchical storage management environment 100. In one embodiment, storage device 106 may be a hard disk drive (HDD) capable of storing pre-migrated data prior to migration to one or more magnetic tape cartridges of a tape library, such as tape media 118 of tape library 108. In one embodiment, storage device 106 may be a hard disk drive (HDD) capable of receiving recalled data from one or more magnetic tape cartridges of a tape library, such as tape media 118 of tape library 108. In one embodiment, storage device 106 is a resident state storage solution in a hierarchical storage management (HSM) environment where data may be written prior to migration to a secondary storage solution, such as tape library 108. In one embodiment, storage device 106 may include one or more databases capable of receiving, organizing, retrieving, and storing data in a HSM environment. In one embodiment, storage device 106 may be a solid-state drive (SSD) capable of storing pre-migrated data prior to migration to one or more magnetic tape cartridges of a tape library, such as tape media 118 of tape library 108. In one embodiment, storage device 106 may be a solid-state drive (SSD) capable of receiving recalled data from one or more magnetic tape cartridges of a tape library, such as tape media 118 of tape library 108.

In one embodiment, tape library 108 is a tape storage library interconnected with a host (e.g., a tape library mainframe, a client computer, etc.), such as server computer 104. In one embodiment, tape library 108 provides the capability to store data files, such as files 114, through the use of an integrated tape drive, such as tape drive 116, and one or more magnetic tape cartridges, such as tape media 118, organized into one or more tape media pools, such as tape media pool 120, tape media pool 122, and tape media pool 124. In one embodiment, tape library 108 may represent a plurality of interconnected physical tape libraries. In one embodiment, a plurality of tape library frames (not shown) can be interconnected to form one or more tape libraries, such as tape library 108. In one embodiment, one or more tape libraries, such as tape library 108, can be organized into a plurality of columns evenly spaced within a floor space (i.e., a designated space within, for example, a physical structure). In another embodiment, one or more tape library frames may be stacked atop one or more tape libraries organized into the plurality of columns to satisfy growth demands of big data tape management, within an existing floor space, by effectively building up, as opposed to building out. In one embodiment, tape library 108 includes a tape gripper (not shown) for retrieving one or more tape cartridges, such as tape media 118, from a plurality of tape cartridge storage slots (not shown) within one or more interconnected tape library frames (not shown) designated for tape storage and inserting the one or more tape cartridges into a tape drive (i.e., mount), such as tape drive 116, for read/write operations.

In one embodiment, tape drive 116 is a data storage device for executing read and write information on one or more tape cartridges. In one embodiment, tape drive 116 is arranged in a column within a tape library frame of a tape library, such as tape library 108. In one embodiment, tape drive 116 and one or more tape cartridges, such as tape media 118, are stored separately within a tape library frame, or within a tape library, such as tape library 108, that includes one or more tape library frames (i.e., tape media 118 is stored separately from tape drive 116, in one or more tape library frames dedicated for tape media storage). In one embodiment, a tape library, such as tape library 108, includes a plurality of tape drives for executing read and write information on the one or more tape cartridges.

In an alternative embodiment, tape drive 116 may include one or more integrated programs (not shown), such as duplication program 110, a primary storage device (not shown) and a secondary storage device (not shown) for tape media duplication during a migration operation. In the alternative embodiment, tape drive 116 provides a mechanism for, when saving a file to a tape media in a first tape media pool and redundantly writing the file to a tape media in a second tape media pool, recording pointer information (e.g., writing a pointer to the file) in the second tape media pool and writing the file to a tape media of a third tape media pool.

In one embodiment, tape media 118 is a magnetic tape cartridge capable of storing data within a tape library, such as tape library 108. In one embodiment, tape media 118 may be high-density magnetic tape media capable of storing digital information within a tape library, such as tape library 108. In one embodiment, one or more tape cartridges, such as tape media 118, may be stored within a high-density storage slot (not shown) within a tape library, such as tape library 108, where the high-density storage slot is capable of storing up to five tape cartridges stacked in a row within a single slot space within a tape library frame (not shown) of tape library 108. In one embodiment, tape media 118 may be linear tape open (LTO) tape cartridges. In another embodiment, tape media 118 may be enterprise tape cartridges. For example, high-density storage slots are capable of storing up to five tape cartridges in a tiered orientation, with a tier 5 position on linear tape open (LTO) tape cartridges being a first tape cartridge loaded into the slot (rear-most tape cartridge on a depth side of a tape library frame), and a tier 1 position being a last tape cartridge loaded into the slot (forward-most tape cartridge on a front side of a tape library frame). Where a tier 5 position LTO tape cartridge is requested, the LTO tape cartridges forward of it (up to four cartridges), need to be removed in order to access the requested LTO tape cartridge. In alternative embodiments, high-density storage slots, are capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge. In one embodiment, one or more tape cartridges, such as tape media 118 may be clustered into one or more pools, such as tape media pool 120, tape media pool 122, and tape media pool 124, as file copy destinations, file copy sources, and duplicated tape media of various tape media from different tape media pools within a tape library. It should be appreciated that embodiments of the present invention may be practiced with a tape library having any number or type of tape media capable of being stored in any number of tiered positions within a high-density storage slot.

In one embodiment, tape media pool 120, tape media pool 122, and tape media pool 124 are tape media pools made up of a cluster of tape media, such as tape media 118, for managing storage of various data files, such as files 114. In one embodiment, tape media pool 120, tape media pool 122, and tape media pool 124 are a set of tape cartridges, such as tape media 118, of the same type (e.g., write-once-read-many (WORM) or non-WORM, LTO tape cartridges or enterprise tape cartridges) that are in one logical tape library. In one embodiment, tape media pool 120, tape media pool 122, and tape media pool 124 utilize the same generation of tape media with each pool. In one embodiment, tape media pool 120, tape media pool 122, and tape media pool 124 represent a copy source pool, a full-contents copy pool, and a system pool, respectively.

Figure 2:
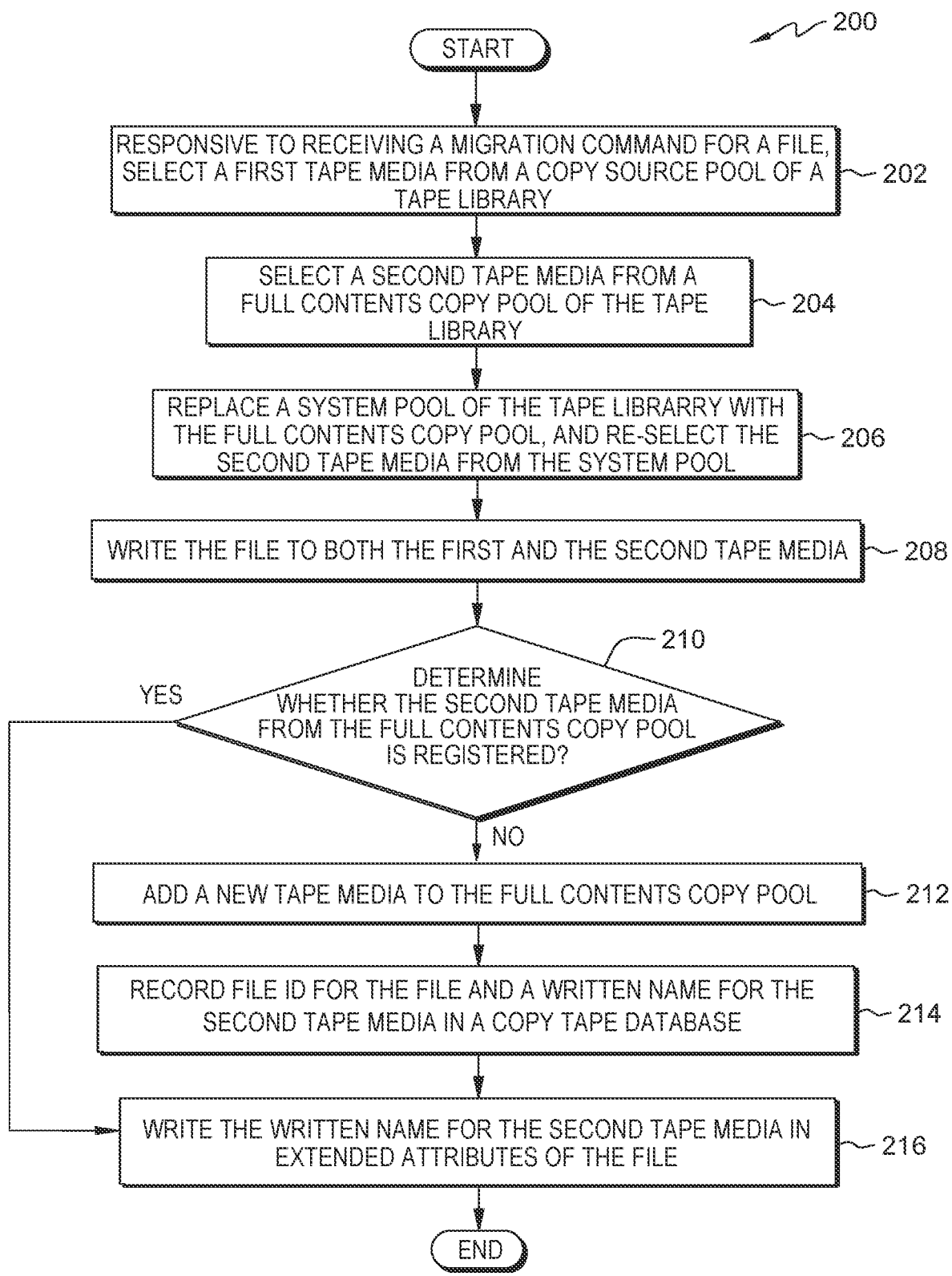
FIG. 2 is a flowchart diagram of the steps of a duplication program for writing to tape media of a full-contents copy pool, in accordance with an embodiment of the present invention.

FIG. 2 is a flowchart diagram of the steps of a duplication program, such as duplication program 110, for writing to tape media of a full-contents copy pool, generally designated 200, in accordance with an embodiment of the present invention.

Duplication program 110 selects a first tape media from a copy source pool of a tape library (202). In one embodiment, responsive to receiving a migration command for a file, duplication program 110 selects a first tape media from a first tape media pool in a tape library, where the first tape media from the first tape media pool is a source pool for the file or files targeted for migration by the migration command. In one embodiment, a copy source pool is a pool of tape media that has been identified in a migration command as having a file or files targeted to be copied. In one embodiment, the first tape media pool, such as tape media pool 120, is a copy source pool that includes a plurality of files, such as files 114, to be migrated. In one embodiment, duplication program 110 receives a migrate command for recording data of a file or files, such as files 114, from the first tape media of the first tape media pool, such as tape media 118 of tape media pool 120.

Duplication program 110 selects a second tape media from a full-contents copy pool of the tape library (204). In one embodiment, duplication program 110 selects the second tape media from a second tape media pool, such as tape media 118 of tape media pool 122, as a recording destination to be specified for an argument. In one embodiment, the full-contents copy pool is a pool of tape media corresponding to the tape media of the copy source pool that has been selected as a recording destination functioning as a complete contents copy/backup of all files in the tape media of the copy source pool. In one embodiment, duplication program 110 can specify up to three tape media pools as full-contents copy pools (e.g., recording destination pools). In one embodiment, responsive to receiving the migrate command for a file, duplication program 110 selects the second tape media from a full-contents copy pool, such as tape media 118 of tape media pool 122, to record the main body data of the file or files, such as files 114, from the first tape media of the first tape media pool, such as tape media 118 of tape media pool 120. In one embodiment, duplication program 110 creates a full-contents copy pool based, at least in part, on user specifications for a full-contents copy pool in a tape library, such as tape media pool 122 of tape library 108. In one embodiment, duplication program 110 provides the capability for a user to create a database, referred to as copy pool database (CPDB), for recording information in tape media of the copy source pool, such as tape media 118 of tape media pool 120, and recording information in tape media of a full-contents copy pool, such as tape media 118 of tape media pool 122, that is expected to be a "full-contents copy" (i.e., a complete copy) of all files recorded to tape media in the copy source pool. For example, where Pool A is a copy source pool, such as tape media pool 120, and Pool A' is a full-contents copy pool, such as tape media pool 122, the CPDB contains the information that tape media in the full-contents copy pool to be a "full-contents copy" of a Tape1 of Pool A (e.g., TapeA1) is defined as Tape1 of Pool A' (TapeA'1), and a complete copy of TapeA2 is TapeA'2, and the complete copy of TapeA3 is TapeA'3, etc.

Duplication program 110 replaces a system pool of the tape library with the full-contents copy pool (206). In one embodiment, duplication program 110 replaces a system pool of the tape library with the full-contents copy pool as the argument for recording, and re-selects the second tape media from the system pool. In one embodiment, duplication program 110 re-selects the second tape media from the system pool by selecting a third tape media registered to the system pool. In one embodiment, the system pool is a pool of tape media not directly utilized by a user, but instead utilized by duplication program 110 for duplicating in full the file or files from the first tape media of the copy source pool, such as tape media 118 of tape media pool 120. In one embodiment, the re-selected second tape media (i.e., the third tape media selected from the system pool) functions as a temporary copy destination substituted for the second tape media of a recording destination pool when a file is to be written to both the first tape media of a copy source pool and the second tape media of the recoding destination pool concurrently.

Duplication program 110 writes the file to both the first and re-selected second tape media (208). In one embodiment, duplication program 110 instructs the tape library, such as tape library 108, to mount the first tape media of the copy source pool, such as tape media 118 of tape media pool 120, to a tape drive, such as tape drive 116, and record the file or files to the first tape media of the copy source pool. In one embodiment, duplication program 110 instructs the tape library, such as tape library 108, to mount the re-selected second tape media (i.e., the third tape media) of the system pool, such as tape media 118 of tape media pool 124, to a tape drive, such as tape drive 116, and record the file or files to the re-selected second tape media of the system pool. In one embodiment, where the tape drive, such as tape drive 116, is capable of writing to multiple tape media simultaneously, duplication program 110 instructs the tape drive to write the file or files, such as files 114, to both the first tape media of the copy source pool, such as tape media 118 of tape media pool 120, and the re-selected second tape media of the system pool, such as tape media 118 of tape media pool 124. In one embodiment, duplication program 110 selects an optimum tape media as the first tape media and re-selected second tape media based, at least in part, on performance and efficiency metrics. For example, where a first tape media among tape media clustered in a recording destination pool (e.g., a copy source pool) is currently mounted to a tape drive, it is more efficient to utilize the mounted tape media, and to exclude any tape media that are currently being used for other purposes, such as recall operations, from candidate tape media for the migrate operation.

Duplication program 110 determines whether the second tape media from the full-contents copy pool is registered (decision block, 210). In one embodiment, duplication program 110 determines whether the second tape media from the full-contents copy pool is registered by determining whether the second tape media (i.e., a full-contents copy tape media) of the full-contents copy pool, such as tape media 118 of tape media pool 122, corresponding to the first tape media of the copy source pool, such as tape media 118 of tape media pool 120, is registered. In one embodiment, duplication program 110 determines whether the second tape media of the full-contents copy pool is registered by querying a copy pool database (CPDB) for registration information related to the second tape media. Where duplication program 110 determines that the query of the CPDB returns registration information for the second tape media, duplication program 110 determines that the second tape media from the full-contents copy pool is registered. Where duplication program 110 determines that the query of the CPDB does not return registration information for the second tape media, duplication program 110 determines that the second tape media from the full-contents copy pool is not registered.

Responsive to a determination that the second tape media from the full-contents copy pool is not registered (NO branch, 210), duplication program 110 adds a new tape media to the full-contents copy pool (212). In one embodiment, duplication program 110 instructs a tape library, such as tape library 108, to add a new tape media (i.e., a fourth tape media) to the full-contents copy pool, such as tape media pool 122. In one embodiment, responsive to a new tape media being added to the full-contents copy pool, duplication program 110 registers the new tape media in the CPDB and creates a new copy tape database (CTDB) for the new tape media.

Duplication program 110 records a file identifier (ID) for the file and a written name for the second tape media in a copy tape database (CTBD) (214). In one embodiment, duplication program 110 records the file ID (e.g., a pointer to the file, a pointer, a unique file identifier, etc.) for the file and a written name for the second tape media in the copy tape database (CTDB). In some embodiments, where the second tape media from the full-contents copy pool is not registered and a new tape media is added to the full-contents copy pool, the file ID is not always recorded (i.e., registered) in the CTDB, and background processing of the files may occur according to steps discussed in further detail in FIG. 3.

Responsive to a determination that the second tape media from the full-contents copy pool is registered (YES branch, 210), duplication program 110 writes the written name for the second tape media in extended attributes of the file (216). In one embodiment, duplication program 110 opens a copy tape database (CTDB) of the second tape media of the full-contents copy pool. In one embodiment, duplication program 110 records information indicating tape media that each file was recorded to as an extended attribute of the file on disk. In one embodiment, duplication program 110 records and duplicates the main body data of the file (e.g., the main body data of a file on a disk that is recorded in tape media) on up to three tape media in total. In one embodiment, duplication program 110 records information from the second tape media in the extended attributes of the file.

Figure 3:
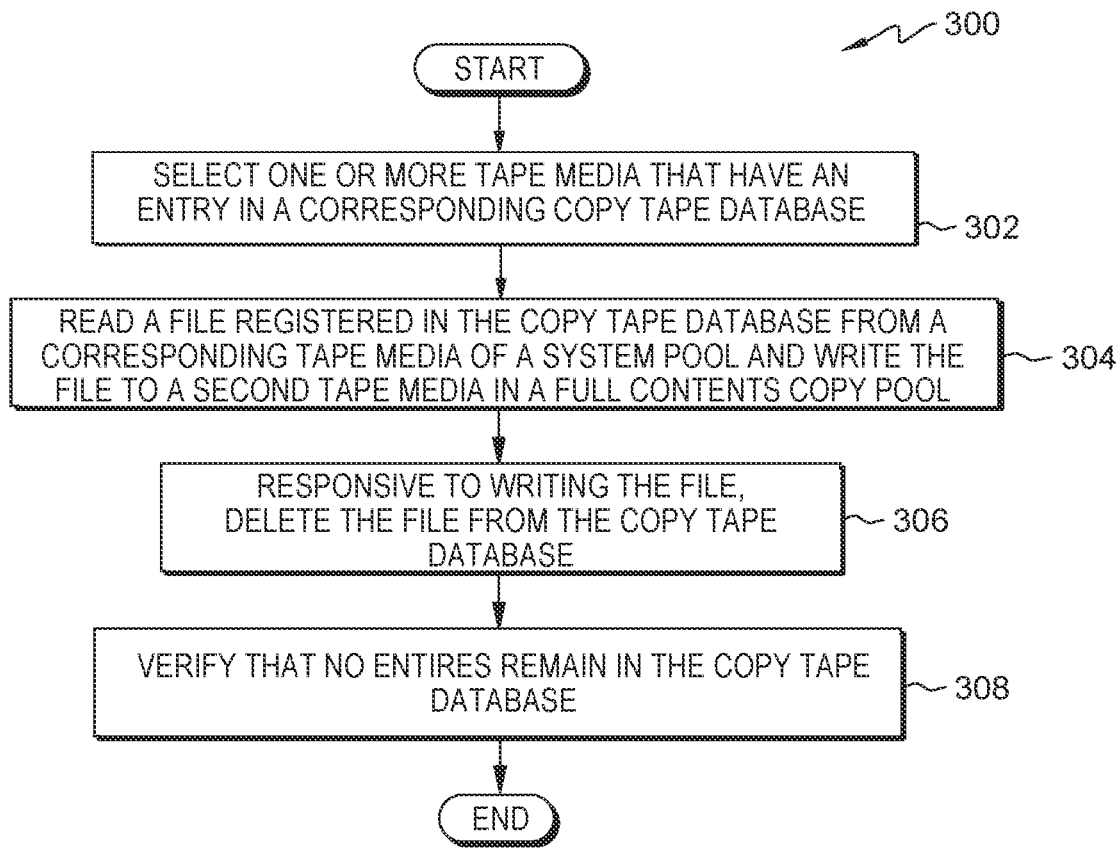
FIG. 3 is a flowchart diagram of the steps of a duplication program for background processing of tape media in a full-contents copy pool, in accordance with an embodiment of the present invention.

FIG. 3 is a flowchart diagram of the steps of a migration program, such as duplication program 110, for background processing of tape media of a full-contents copy pool, generally designated 300, in accordance with an embodiment of the present invention.

Duplication program 110 selects one or more tape media that have an entry in a corresponding copy tape database (302). In one embodiment, duplication program 110 selects one or more tape media that have an entry in a corresponding copy tape database (CTDB) and are included in tape media registered in a copy pool database (CPDB).

Duplication program 110 reads a file registered in the copy tape database from a corresponding tape media of a system pool (304). In one embodiment, duplication program 110 instructs a tape drive, such as tape drive 116, to read a file registered in the copy tape database from a corresponding tape media of a system pool, such as tape media 118 of tape media pool 124, and write the file to a second tape media in a full-contents copy pool, such as tape media 118 of tape media pool 122.

Duplication program 110 deletes the file from the copy tape database (306). In one embodiment, responsive to writing the file or files, such as files 114, to the second tape media in the full-contents copy pool, such as tape media 118 of tape media pool 122, duplication program 110 deletes the file from the copy tape database.

Duplication program 110 verifies that no entries remain in the copy tape database (308). In one embodiment, duplication program 110 verifies that no entries remain in the copy tape database (CTDB) by querying entries of files registered in the CTDB until no entries are returned. Responsive to the query returning no entries of files registered in the CTDB, duplication program 110 ends the background processing.

For example, a tape media having an entry in a copy tape database (CTDB) before this process is completed is referred to as a "quasi-full-contents copy", since although the tape medium of the "quasi-full-contents copy" contains files that have not yet been written to the tape media, all the files recorded in the tape media of the copy source are accessible by referring to the CTDB.

In an alternative embodiment, duplication program 110 provides a process for reading a file from the full-contents copy pool. In one embodiment, duplication program 110 determines whether a file to be read from a full-contents copy pool, such as files 114 from tape media pool 122, is registered in a copy tape database (CTBD). In one embodiment, where the file or files to be read are registered (e.g., "quasi-full-contents copy"), a tape media of a system pool, such as tape media 118 of tape media pool 124, corresponding to the tape media of the full-contents copy pool is identified from the CTDB and the file or files targeted for reading are read from the corresponding tape media of the system pool. In one embodiment, where the file or files to be read are not registered (e.g., "full-contents copy"), the file or files are read from the tape media of the full-contents copy pool as normal, since the file is guaranteed to have already been recorded in the tape media that belongs to the full-contents copy pool (see background processing steps discussed in FIG. 3).

In an example of the above discussed steps for duplicating tape media and associated background processing, consider a scenario where three files, file31.dat, file32.dat, and file33.dat, have been newly recorded in a copy source pool named Pool A, such as tape media pool 120. In this scenario, a full-contents copy pool named Pool A' has been created, such as tape media pool 122, and a tape media named TA0002L8 has been selected from Pool A, and a corresponding tape media S00007L8 has been selected from a system pool named Pool S, such as tape media pool 124. At that time, an example CPDB includes Pool A having registered tape media "TA0001L8, TA0002L8, and TA0005L8", and Pool A' having registered tape media "TB0001L8, TB0002L8, and TB0003L8". Also at this time, an example CTDB for tape media "TB0001L8" includes file IDs "file21.dat, file22.dat, file31.dat, file32.dat, and file33.dat", and tape media "S00005L8, S00010L8, and S00007L8" from Pool S. In addition to tape media "TA0002L8" that was utilized during this migration operation, other tape media are shown recorded in the CPDB. These are tape media to which tape media for "full-contents-copies" are already assigned by a previous migration operation. As the CPDB showed that the tape media for the "full-contents copy" of tape media "TA0002L8" is tape media "TB0001L8", the duplication program 110 added information on a newly recorded file to the CTDB of tape media "TB0001L8". Here, "file21.dat" and "file22.dat" registered in the CTDB are supposed to have been written by the previous operation, but have yet to be copied to the tape media "TB0001L8" of the full-contents pool Pool A'.

In this example, suppose that three files, "file41.dat, file42.dat, and file43.dat", have been newly recorded in Pool A and Pool A', and tape media "TA0003L8" has been selected from Pool A, and tape media "S00017L8" has been selected from Pool S. Since tape media "TA0003L8" was not registered in the CPDB, tape media "TB0004L8" was automatically added to Pool A' from an unused tape registered in Pool A'. A CTDB for the newly added TB0004L8 was created, and three files were added to it. At that time, the example CPDB includes Pool A having tape media "TA0001L8, TA0002L8, TA0005L8, and TA0003L8", and Pool A' having tape media "TB0001L8, TB0002L8, TB0003L8, and TB0004L8". Also at this time, an example CTDB for tape media "TB0004L8" includes file IDs "file41.dat, file42.dat, and file43.dat", and tape media "S00007L8" from Pool S.

In this example, suppose that during automatic background processing, duplication program 110 references the CTBD of tape media "TB0001L8", which includes file IDs "file21.dat, file22.dat, file31.dat, file32.dat, and file33.dat", and tape media "S00005L8, S00010L8, and S00007L8" from Pool S. As there are five entries, the corresponding files must be copied from tape media "S00005L8, S00010L8, and S00007L8" to tape media "TB0001L8", as duplication program 110 references the file IDs (which point to the system pool tape media) from the CTDB of tape media "TB0001L8", and copies each file associated with the file IDs from tape media "S00005L8, S00010L8, and S00007L8" until all file IDs have been copied from the system pool to tape media "TB0001L8", and subsequently deleted from the CTDB of tape media "TB0001L8". Suppose that after "file21.dat and file22.dat" are copied, automatic processing has been interrupted due to a new migrate request that has been issued. At that time, the CTDB includes file IDs "file31.dat, file32.dat, and file33.dat", and tape media "S00007L8" from Pool S. In this scenario, tape media "TB0001L8" of Pool A' is a "quasi-full-contents copy" of tape media "TA0002L8" of Pool A. Once the CTDB of tape media "TB0001L8" is completely empty of file IDs, tape media "TB0001L8" will be a "full-contents copy" of tape media "TA0002L8".

Figure 4:
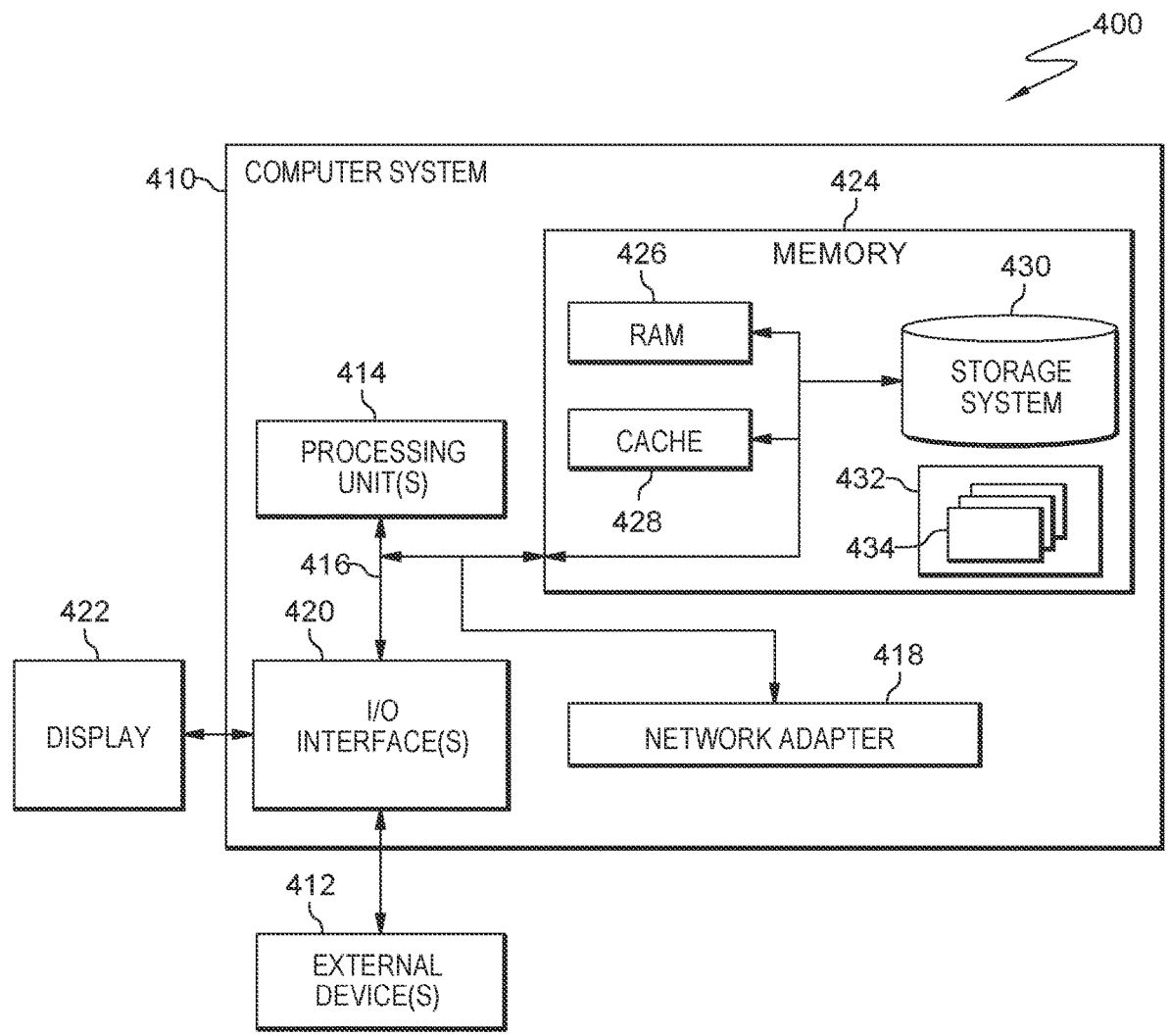
FIG. 4 is a block diagram depicting components of a data processing system, in accordance with an embodiment of the present invention.

FIG. 4 is a block diagram depicting components of computing system, such as server computer 104 of tape library hierarchical storage management environment 100, generally designated 400, in accordance with an embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, server computer 104 in a tape library hierarchical storage management environment 100 is shown in the form of a general-purpose computing device, such as computer system 410. The components of computer system 410 may include, but are not limited to, one or more processors or processing unit(s) 414, memory 424 and bus 416 that couples various system components including memory 424 to processing unit(s) 414.

Bus 416 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 410 typically includes a variety of computer system readable media. Such media may be any available media that is accessible by computer system 410 and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example and not limitation, as well as an operating system, one or more application programs, other program modules and program data. Each of the operating systems, one or more application programs, other program modules and program data or some combination thereof, may include an implementation of a networking environment. Program modules 434 generally carry out the functions and/or methodologies of embodiments of the invention as described herein. Computer system 410 may also communicate with one or more external device(s) 412, such as a keyboard, a pointing device, a display 422, etc. or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks, such as a local area network (LAN), a general wide area network (WAN) and/or a public network (e.g., the Internet) via network adapter 418. As depicted, network adapter 318 communicates with the other components of computer system 410 via bus 416. It should be understood that although not shown, other hardware and software components, such as microcode, device drivers, redundant processing units, external disk drive arrays, RAID systems, tape drives and data archival storage systems may be used in conjunction with computer system 410.

The present invention may be a system, a method and/or a computer program product. The computer program product may include a computer readable storage medium (or media) having computer readable program instructions thereon for causing a processor to carry out aspects of the present invention. In one embodiment, the computer readable storage medium having computer readable program instructions thereon may be internal to a server computer, such as server computer 104. In another embodiment, the computer readable storage medium having computer readable program instructions thereon may be internal to a server computer, such as server computer 104. In other embodiments, the computer readable storage medium having computer readable program instructions thereon may be stored external to a server computer, such as server computer 104, such that a client computer communicates with server computer 104 through a network connection, such as network 102, to execute the computer readable program instructions on a tape library, such as tape library 108.

In another embodiment, the computer readable storage medium having computer readable program instructions thereon may be internal to a tape library, such as tape library 108. In other embodiments, the computer readable storage medium having computer readable program instructions thereon may be stored external to a tape library, such as tape library 108, such that a server computer, such as server computer 104 communicates with tape library 108 through a network connection, such as network 102, to execute the computer readable program instructions on tape library 108.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A computer-implemented method comprising:
   selecting, by one or more computer processors, a first tape medium of a first pool and a second tape medium of a second pool based, at least in part, on a migration command for a file;
   instructing, by the one or more computer processors, a tape drive to write the file to both the first tape medium of the first pool and a third tape medium of a system pool of a tape library;
   in response to determining that the second tape medium is not registered in a copy pool database (CPDB), recording, in a copy table database (CTDB) by the one or more computer processors, i) a file identifier (ID) for the file and ii) an identifier for the second tape medium of the second pool, wherein the file ID points to the file written to the third tape medium of the system pool; and
   instructing, by the one or more computer processors, the tape drive to read the file from the third tape medium of the system pool utilizing the file ID in the CTDB, and to write the file to the second tape medium of the second pool.

2. The computer-implemented method of claim 1, further comprising:
determining, by the one or more computer processors, the second tape medium of the second pool is not registered in the CPDB; and
responsive to a determination that the second tape medium is not registered in the CPDB, instructing, by the one or more computer processors, the tape drive to add a fourth tape medium to the second pool.

3. The computer-implemented method of claim 2, further comprising:
registering, in the CPDB by the one or more computer processors, the fourth tape medium of the second pool; and
creating, by the one or more computer processors, a new copy tape database for the fourth tape medium.

4. The computer-implemented method of claim 2, wherein determining whether the second tape medium of the second pool is registered, further comprises:
querying, by the one or more computer processors, the CPDB for registration information related to the second tape medium of the second pool; and
determining, by the one or more computer processors, where the querying of the CPDB does not return registration information for the second tape medium that the second tape medium of the second pool is not registered.

5. The computer-implemented method of claim 1, further comprising:
creating, by the one or more computer processors, the second pool based, at least in part, on user specifications for a full-contents copy pool, wherein tape media of the second pool include complete copies of files recorded to the first pool.

6. The computer-implemented method of claim 1, further comprising:
responsive to writing the file to the second tape medium of the second pool, deleting, by the one or more computer processors, the file ID from the CTDB.

7. The computer-implemented method of claim 1, further comprising:
selecting, by the one or more computer processors, the first tape medium of the first pool and the third tape medium of the system pool based, at least in part, on performance and efficiency metrics.

8. A computer program product comprising:
one or more computer readable storage media and program instructions stored on the one or more computer readable storage media, the stored program instructions comprising:
program instructions to select a first tape medium of a first pool and a second tape medium of a second pool based, at least in part, on a migration command for a file;
program instructions to instruct a tape drive to write the file to both the first tape medium of the first pool and a third tape medium of a system pool of a tape library;
program instructions to, in response to determining that the second tape medium is not registered in a copy pool database (CPDB), record, in a copy table database (CTDB), i) a file identifier (ID) for the file and ii) an identifier for the second tape medium of the second pool, wherein the file ID points to the file written to the third tape medium of the system pool; and
program instructions to instruct the tape drive to read the file from the third tape medium of the system pool utilizing the file ID in the CTDB, and to write the file to the second tape medium of the second pool.

9. The computer program product of claim 8, the stored program instructions further comprising:
program instructions to determine the second tape medium of the second pool is not registered in the CPDB; and
program instructions to, responsive to a determination that the second tape medium is not registered in the CPDB, instruct the tape drive to add a fourth tape medium to the second pool.

10. The computer program product of claim 9, the stored program instructions further comprising:
program instructions to register, in the CPDB, the fourth tape medium of the second pool; and
program instructions to create a new copy tape database for the fourth tape medium.

11. The computer program product of claim 9, wherein program instructions to determine whether the second tape medium of the second pool is registered further comprise:
program instructions to query the CPDB for registration information related to the second tape medium of the second pool; and
program instructions to determine where the query of the CPDB does not return registration information for the second tape media that the second tape medium of second pool is not registered.

12. The computer program product of claim 8, the stored program instructions further comprising:
program instructions to create the second pool based, at least in part, on user specifications for a full-contents copy pool, wherein tape media of the second pool include complete copies of files recorded to the first pool.

13. The computer program product of claim 8, the stored program instructions further comprising:
program instruction to, responsive to writing the file to the second tape medium of the second pool, delete the file ID from the CTDB.

14. The computer program product of claim 8, the stored program instructions further comprising:
program instructions to select the first tape medium of the first pool and the third tape medium of the system pool based, at least in part, on performance and efficiency metrics.

15. A computer system comprising:
one or more computer processors;
one or more computer readable storage media; and
program instructions stored on at least one of the one or more computer readable storage media for execution by at least one of the one or more computer processors, the stored program instructions comprising:
program instructions to select a first tape medium of a first pool and a second tape medium of a second pool based, at least in part, on a migration command for a file;
program instructions to instruct a tape drive to write the file to both the first tape medium of the first pool and a third tape medium of a system pool of a tape library;

program instructions to, in response to determining that the second tape medium is not registered in a copy pool database (CPDB), record, in a copy tape database (CTDB), (i) a file identifier (ID) for the file and (ii) an identifier for the second tape medium of the second pool, wherein the file ID points to the file written to the third tape medium of the system pool; and program instructions to instruct the tape drive to read the file from the third tape medium of the system pool utilizing the file ID in the CTDB, and to write the file to the second tape medium of the second pool.

16. The computer system of claim 15, the stored program instructions further comprising:

program instructions to determine the second tape medium of the second pool is registered in the CPDB; and program instructions to, responsive to a determination that the second tape medium is not registered in the CPDB, instruct the tape drive to add a fourth tape medium to the second pool.

17. The computer system of claim 16, the stored program instructions further comprising:

program instructions to register, in the CPDB, the fourth tape medium of the second pool; and program instructions to create a new copy tape database for the fourth tape medium.

18. The computer system of claim 16, wherein program instructions to determine whether the second tape media of the recording destination pool is registered further comprise:

program instructions to query the CPDB for registration information related to the second tape medium of the second pool; and program instructions to determine where the query of the CPDB does not return registration information for the second tape media that the second tape medium of second pool is not registered.

19. The computer system of claim 15, the stored program instructions further comprising:

program instructions to create the second pool based, at least in part, on user specifications for a full-contents copy pool, wherein tape media of the second pool include complete copies of files recorded to the first pool.

20. The computer system of claim 15, the stored program instructions further comprising:

program instruction to, responsive to writing the file to the second tape medium of the second pool, delete the file ID from the CTDB.

* * * * *